(12) United States Patent  
Savolainen et al.

(10) Patent No.: US 9,125,148 B2  
(45) Date of Patent: Sep. 1, 2015

(54) METHOD AND APPARATUS FOR ENABLING PROVISION OF ROUTING INFORMATION AND NETWORK SELECTION INFORMATION TO ONE OR MORE DEVICES

(75) Inventors: Teemu Ilmari Savolainen, Nokia (FI); Jouni Ilari Korhonen, Riihimaki (FI)

(73) Assignee: Nokia Technologies Oy, Espoo (FI)

( * ) Notice: Subject to any disclaimer, the term of this patent is extended or adjusted under 35 U.S.C. 154(b) by 163 days.

(21) Appl. No.: 14/007,741

(22) PCT Filed: Apr. 5, 2011

(86) PCT No.: PCT/IB2011/051467  
§ 371 (c)(1),  
(2), (4) Date: Sep. 26, 2013

(87) PCT Pub. No.: WO2012/137039  
PCT Pub. Date: Oct. 11, 2012

(65) Prior Publication Data  
US 2014/0016557 A1    Jan. 16, 2014

(51) Int. Cl.  
*H04W 40/24* (2009.01)  
*H04L 12/751* (2013.01)  
*H04L 12/54* (2013.01)

(52) U.S. Cl.  
CPC ............. *H04W 40/248* (2013.01); *H04L 45/02* (2013.01); *H04L 12/5691* (2013.01)

(58) Field of Classification Search  
CPC .. H04W 40/248; H04L 12/5691; H04L 45/02  
See application file for complete search history.

(56) References Cited

U.S. PATENT DOCUMENTS 7,203,190 B1 * 4/2007 Ruban et al. .................. 370/356  
2009/0274069 A1 * 11/2009 Olsson et al. ................. 370/255  
(Continued)

FOREIGN PATENT DOCUMENTS

| WO | 2009127238 A1 | 10/2009 |
| WO | 2010037422 A1 | 4/2010 |
| WO | 2010080966 A1 | 7/2010 |

OTHER PUBLICATIONS

International Search Report and Report and Written Opinion received in corresponding Patent Cooperation Treaty Application No. PCT/IB2011/051467. Dated Jan. 11, 2012. 11 pages.

(Continued)

*Primary Examiner* — Clemence Han  
(74) *Attorney, Agent, or Firm* — Nokia Technologies Oy

(57) ABSTRACT

An apparatus for providing route information to a device(s) may include a processor and memory storing executable computer program code that cause the apparatus to at least perform operations including receiving route information from a network device defining rules for devices for connection to a network(s). The computer program code may further cause the apparatus to convert the route information into a type of packet data to obtain route selection information corresponding to the route information. The route selection information is generated on behalf of a device(s) that is unable to communicate with the network device to use the route information to select an interface(s) for communication of content. The computer program code may further cause the apparatus to provide the route selection information to the device to utilize the route information to select an interface(s) for communication of data. Corresponding methods and computer program products are also provided.

20 Claims, 11 Drawing Sheets

(56) References Cited

U.S. PATENT DOCUMENTS

| | | |
|---|---|---|
| 2011/0264780 A1* | 10/2011 | Reunamaki et al. .......... 709/223 |
| 2011/0317571 A1* | 12/2011 | Kokkinen et al. ............. 370/252 |
| 2012/0309447 A1* | 12/2012 | Mustajarvi et al. ........... 455/524 |
| 2013/0034019 A1* | 2/2013 | Mustajarvi .................... 370/254 |
| 2013/0142042 A1* | 6/2013 | Garcia Martin et al. ...... 370/230 |
| 2013/0208696 A1* | 8/2013 | Garcia Martin et al. ...... 370/331 |

OTHER PUBLICATIONS

"Dynamic Host Configuration Protocol (DHCPv4 and DHCPv6) Options for Access Network Discovery and Selection Function(ANDSDF) Discovery", Internet Draft, Oct. 19, 2010, http://tools.ietf.org/html/draft-das-mipshop-andsf-dhcp-options-07; whole document.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
| Cur Hop Limit |M|O|H| Resvd |       Router Lifetime           |
+-+-+-+-+-+-+-+-+-+-+-+-+-+-+-+-+-+-+-+-+-+-+-+-+-+-+-+-+-+-+-+-+
|                         Reachable Time                        |
+-+-+-+-+-+-+-+-+-+-+-+-+-+-+-+-+-+-+-+-+-+-+-+-+-+-+-+-+-+-+-+-+
|                         Retrans Timer                         |
+-+-+-+-+-+-+-+-+-+-+-+-+-+-+-+-+-+-+-+-+-+-+-+-+-+-+-+-+-+-+-+-+
|   Options ...
+-+-+-+-+-+-+-+-+-+-+-+-
```

FIG. 7.

METHOD AND APPARATUS FOR ENABLING PROVISION OF ROUTING INFORMATION AND NETWORK SELECTION INFORMATION TO ONE OR MORE DEVICES

TECHNOLOGICAL FIELD

Embodiments of the invention relate generally to communication technology and more particularly relates to a method, apparatus and computer program product for enabling provision of routing information and/or network selection information to one or more devices to enable the devices to make selections for communicating data.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. In order to provide easier or faster information transfer and convenience, telecommunication industry service providers are developing improvements to existing networks. For example, 3rd Generation Partnership Project (3GPP) compliant mobile networks are currently being deployed. The 3GPP compliant mobile networks (e.g., Long Term Evolution (LTE) communications systems), may be aimed at upgrading prior technologies by improving efficiency, lowering costs, improving services, making use of new spectrum opportunities, and providing better integration with other open standards.

One advantage of 3GPP compliant mobile networks which continues to be shared with other preceding telecommunications standards is the fact that users are enabled to access a network employing such standard while remaining mobile. Thus, for example, users having mobile terminals equipped to communicate in accordance with such standards may travel vast distances while being connected to and maintaining communication with the network.

A 3GPP compliant mobile network may utilize an Access Network Discovery and Selection Function (ANDSF) which may be a tool for configuring 3GPP terminals (e.g., a 3GPP handset, User Equipment) with rules regarding a manner in which to access or select one or more networks as well as providing rules to a 3GPP mobile terminal specifying which network interface to select in order to send (e.g., cellular data, packets, etc.). In this regard, an ANDSF may assist a 3GPP mobile terminal to discover the access networks in their vicinity and to provide rules (policies) to prioritize and manage connections to these networks.

On the other hand, an Internet Engineering Task Force (IETF) standard may define a set of tools informing nodes, such as, for example, non-3GPP devices (e.g., personal computers, laptops, home routers, etc.), where these nodes should send data (e.g., packets). However, IETF does not typically define a set of tools informing a device as to which interface (e.g., a cellular interface, a Wireless Local Area Network (WLAN) interface) to utilize for communicating data. At present, users of non-3GPP devices may manually select the interface to utilize.

Currently, non-3GPP devices such as, for example, personal computers (PCs) may utilize active Universal Serial Bus (USB) data modem dongles and WLAN networks at the same time. In this regard, even if a non-3GPP device (e.g., a PC) has only a single physical interface (e.g., a cellular interface via a USB dongle or WLAN interface), the non-3GPP device may still have virtual interfaces such as Virtual Private Network (VPN) connections active at the same time.

In this regard, although ANDSF typically provides a solution for cellular network operators to configure network and routing information to 3GPP terminals, an ANDSF is generally unable to configure non-3GPP devices that may be connected to the 3GPP terminals.

BRIEF SUMMARY

A method and apparatus are therefore provided for enabling provision of routing information and/or network selection information to one or more devices to enable the devices to utilize the information to select one or more interfaces for communication of data via a network(s).

In this regard, an example embodiment may provide a manner in which to enable non-3GPP devices (e.g., a personal computer, a laptop, a home router, a server, a workstation, etc.) to receive routing information generated by Access Network Discovery and Selection Function, by communicating with User Equipment (UE) (e.g., a 3GPP device or a 3GPP UE). As such, a UE of an example embodiment may provide information relating to improved interface and route selection to non-3GPP devices by generating IP-layer control messages (e.g., messages using IETF standards) based on information received via an ANDSF.

In this manner, based on the information received from the ANDSF, the UE of an example embodiment may, in part, function as an ANDSF with respect to a non-3GPP device. The UE of an example embodiment may receive route and/or network selection information from an ANDSF and may convert the ANDSF data formats to Internet Engineering Task Force (IETF) data formats that the non-3GPP devices may understand and recognize. As such, the UE of an example embodiment may utilize one or more IETF tools to convert the ANDSF data formats to IETF data formats in order to configure the non-3GPP devices based on routing information received from an ANDSF. As such, a UE of an example embodiment may help non-3GPP devices (e.g., personal computer(s), laptop(s), etc.) to reconfigure routing information.

In one example embodiment, a method for enabling provision of route information and/or network selection information to one or more devices is provided. The method may include receiving route information from a network device. The network device may define one or more rules for devices to utilize for connection to one or more networks. The method may also include converting the route information into a type of packet data to obtain route selection information corresponding to data of the route information. The route selection information may be generated on behalf of at least one device that may be unable to communicate with the network device to use the route information to select at least one interface for communication of content. The method may also include enabling provision of the route selection information to the device to enable the device to utilize the route selection information to select one or more interfaces for communication of data.

In another example embodiment, an apparatus for enabling provision of route information and/or network selection information to one or more devices is provided. The apparatus may include a processor and a memory including computer program code. The memory and the computer program code are configured to, with the processor, cause the apparatus to at least perform operations including receiving route information from a network device. The network device may define one or more rules for devices to utilize for connection to one or more networks. The memory and the computer program code may further cause the apparatus to convert the route information into a type of packet data to obtain route selection information corresponding to data of the route information. The route selection information may be generated on behalf of at least one device that may be unable to communicate with the network device to use the route information to select at least one interface for communication of content. The memory and the computer program code may further cause the apparatus to enable provision of the route selection information to the device to enable the device to utilize the route selection information to select one or more interfaces for communication of data.

In another example embodiment, a computer program product for enabling provision of route information and/or network selection information to one or more devices is provided. The computer program product includes at least one computer-readable storage medium having computer executable program code instructions stored therein. The computer executable program code instructions may include program code instructions configured to cause receipt of route information from a network device. The network device may define one or more rules for devices to utilize for connection to one or more networks. The program code instructions may also be configured to convert the route information into a type of packet data to obtain route selection information corresponding to data of the route information. The route selection information may be generated on behalf of at least one device that may be unable to communicate with the network device to use the route information to select at least one interface for communication of content. The program code instructions may also be configured to enable provision of the route selection information to the device to enable the device to utilize the route selection information to select one or more interfaces for communication of data.

In one example embodiment, a method for enabling provision of route information and/or network selection information to one or more devices is provided. The method may include receiving converted route selection information from a device that may receive route information from a network device. The converted route selection information may be generated on behalf of a communication device that may be unable to communicate with the network device to use the route information. The network device may define one or more rules for one or more devices to utilize for connection to one or more networks. The method may also include utilizing the converted route selection information to select one or more interfaces for communication of data.

In another example embodiment, an apparatus for enabling provision of route information and/or network selection information to one or more devices is provided. The apparatus may include a processor and a memory including computer program code. The memory and the computer program code are configured to, with the processor, cause the apparatus to at least perform operations including receiving converted route selection information from a device that may receive route information from a network device. The converted route selection information may be generated on behalf of the apparatus which may be unable to communicate with the network device to use the route information. The network device may define one or more rules for one or more devices to utilize for connection to one or more networks. The memory and the computer program code may further cause the apparatus to utilize the converted route selection information to select one or more interfaces for communication of data.

In another example embodiment, a computer program product for enabling provision of route information and/or network selection information to one or more devices is provided. The computer program product includes at least one computer-readable storage medium having computer executable program code instructions stored therein. The computer executable program code instructions may include program code instructions configured to receive converted route selection information from a device that may receive route information from a network device. The converted route selection information may be generated on behalf of a communication device that may be unable to communicate with the network device to use the route information. The network device may define one or more rules for one or more devices to utilize for connection to one or more networks. The program code instructions may also be configured to utilize the converted route selection information to select one or more interfaces for communication of data.

Embodiments of the invention may provide a manner in which to enable non-3GPP devices to obtain routing information generated by a 3GPP network device such as, for example, an ANDSF. As such, communication device users may enjoy improved benefits with respect to selection of routes and/or network interfaces for communication of data. Additionally, by utilizing some example embodiments of the invention, network operators may extend their control to devices (e.g., PC, server, laptop, home gateway, etc.) connected, or attached, to a UE that the network operator may already have some control over.

BRIEF DESCRIPTION OF THE SEVERAL VIEWS OF THE DRAWINGS

Figure 1:
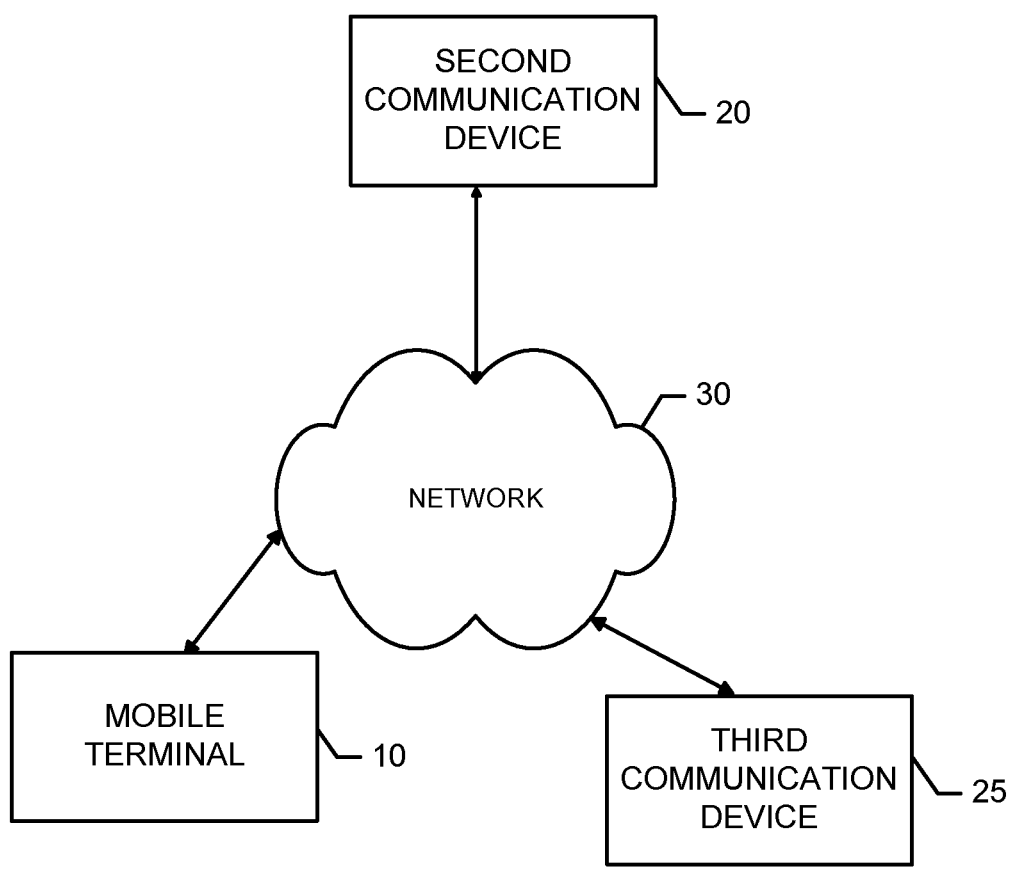
Figure 2:
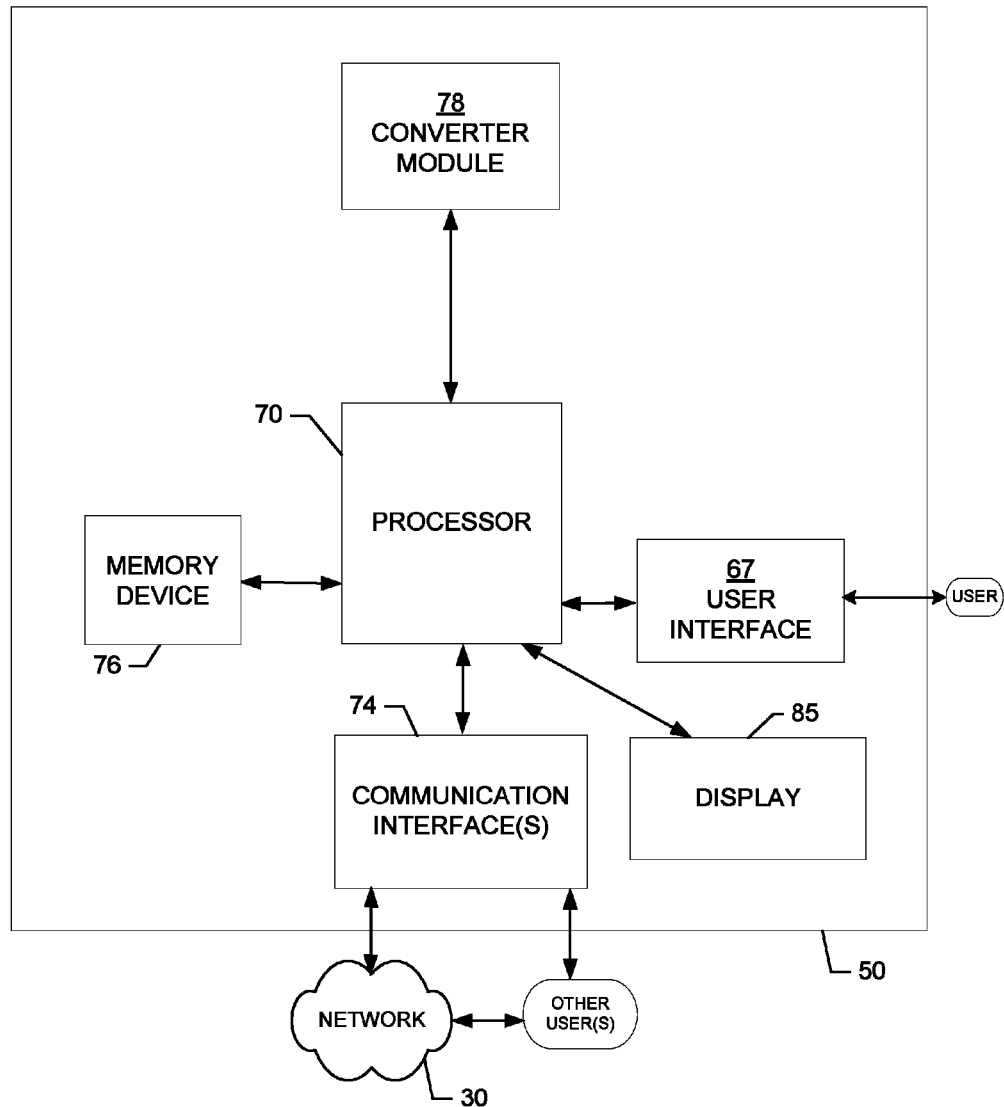
Figure 3:
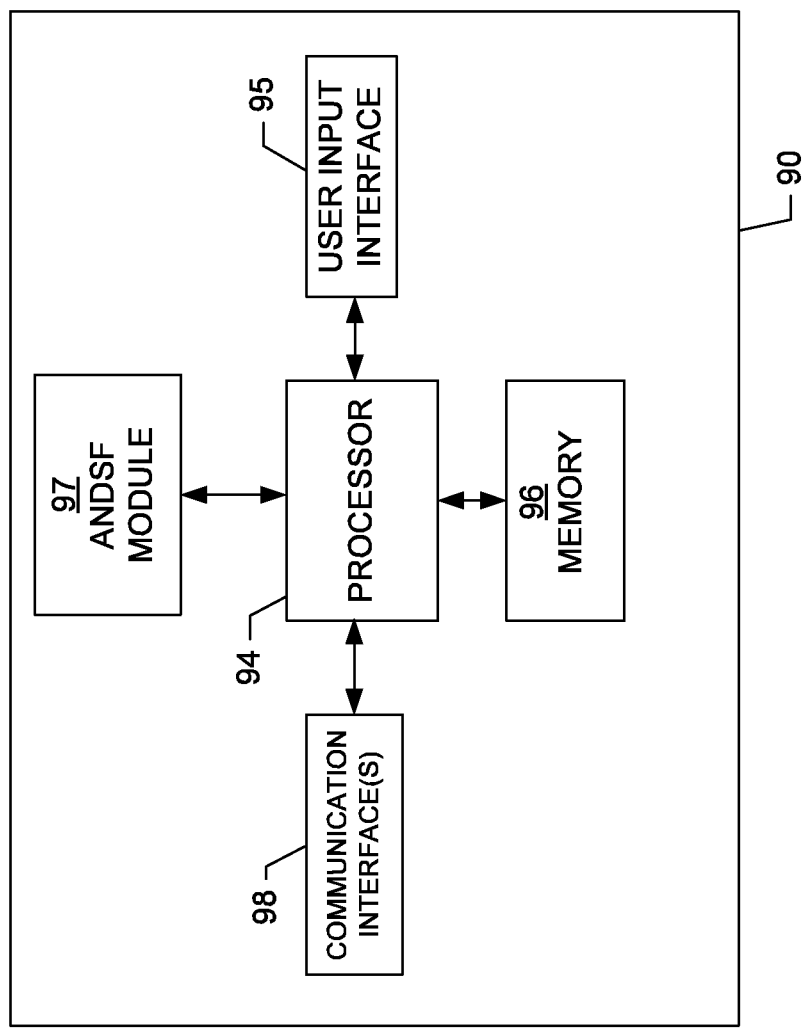
Figure 4:
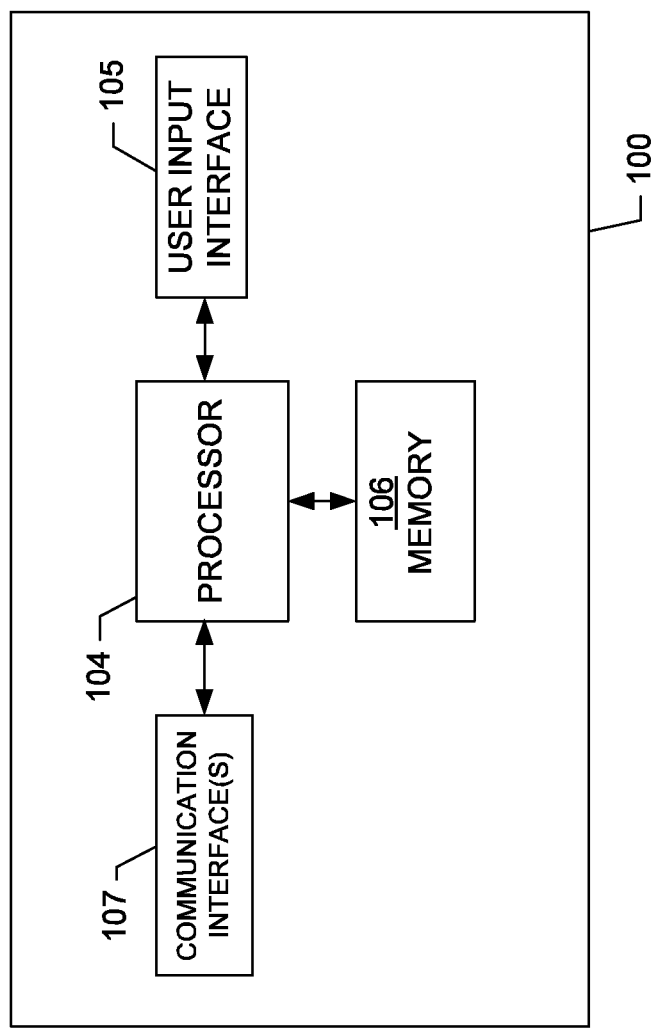
Figure 5:
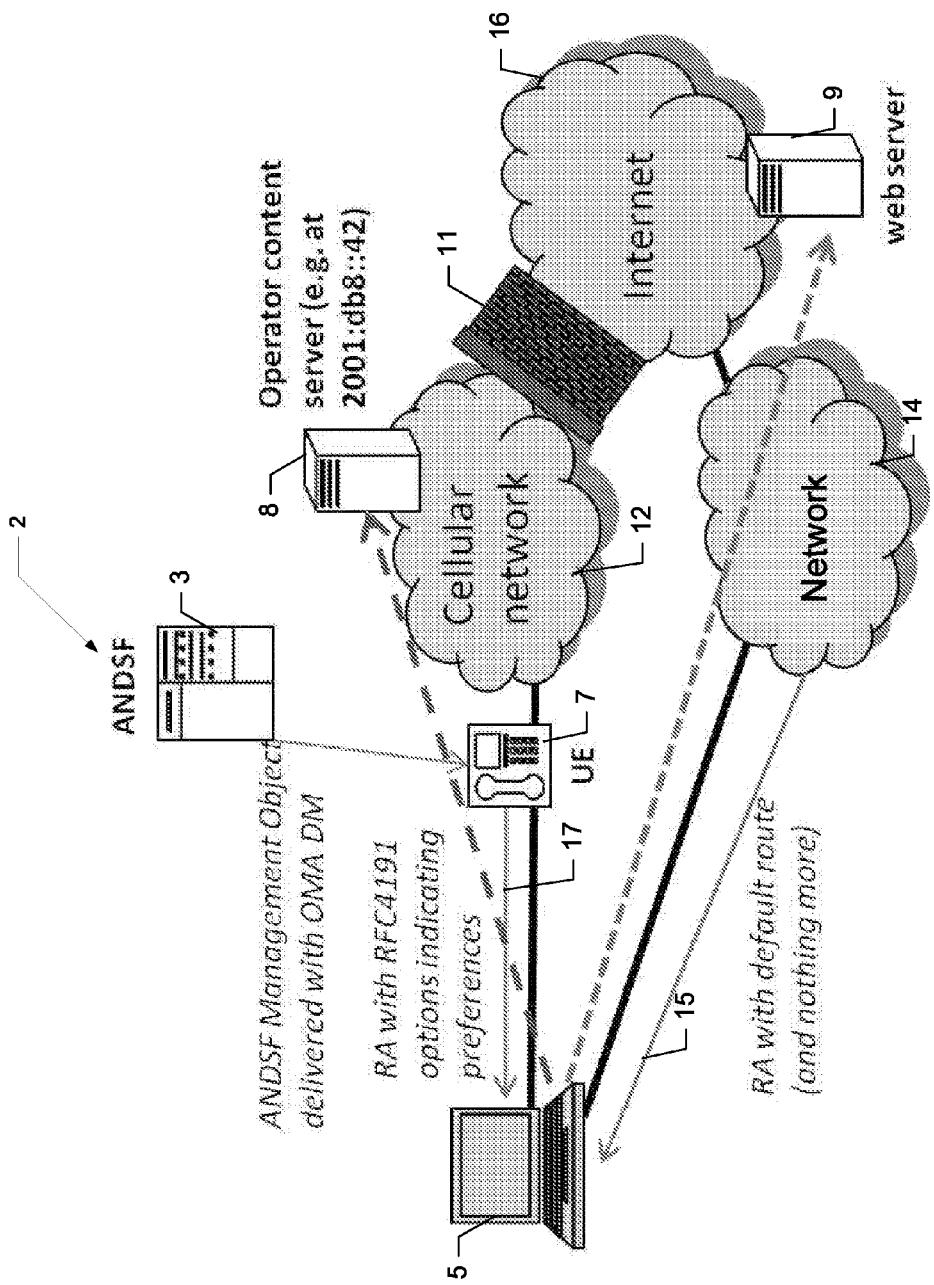
Figure 6A:
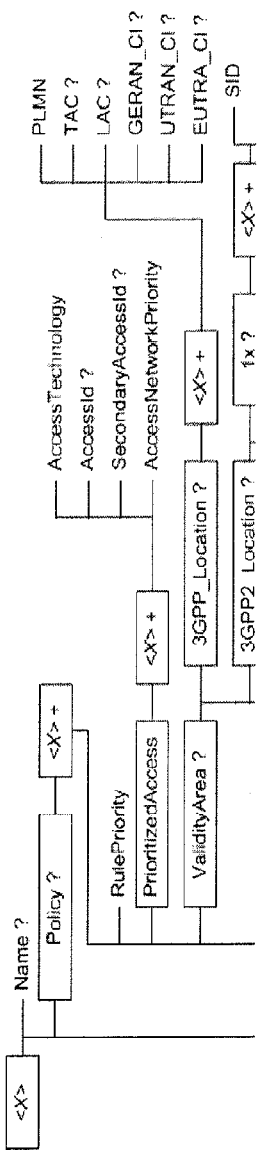
Figure 6B:
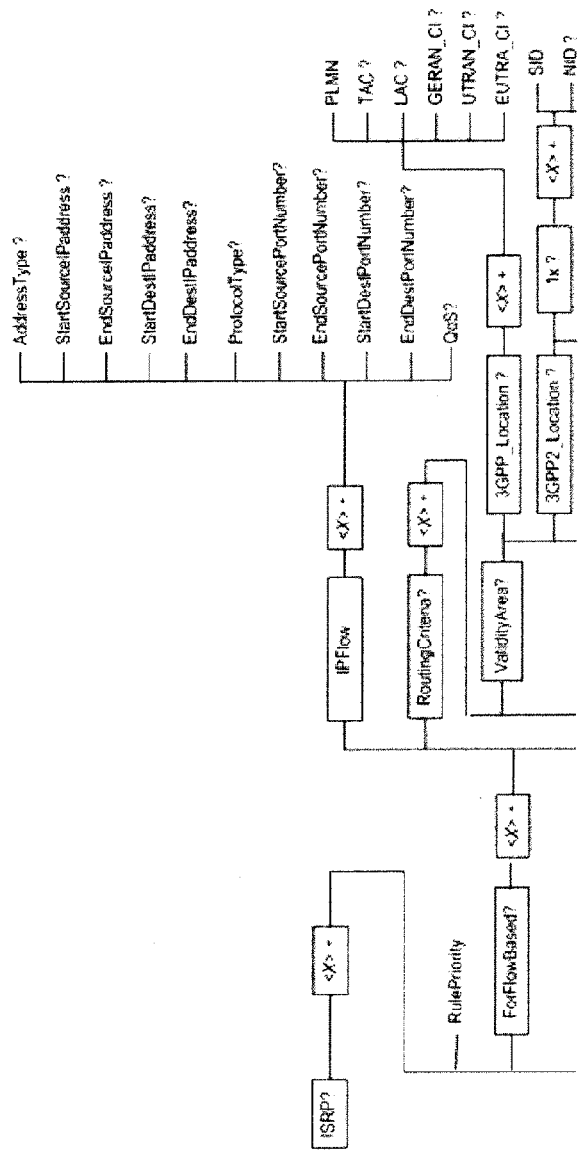
Figure 8:
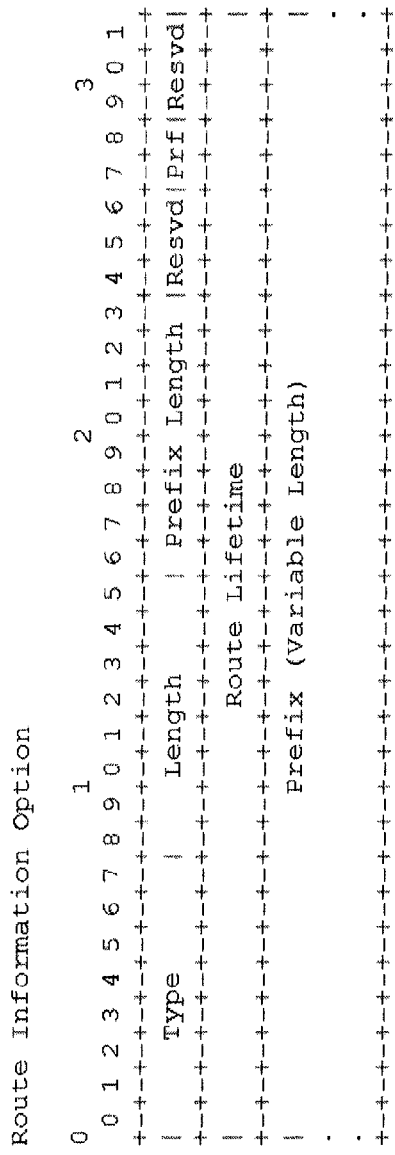
Figure 9:
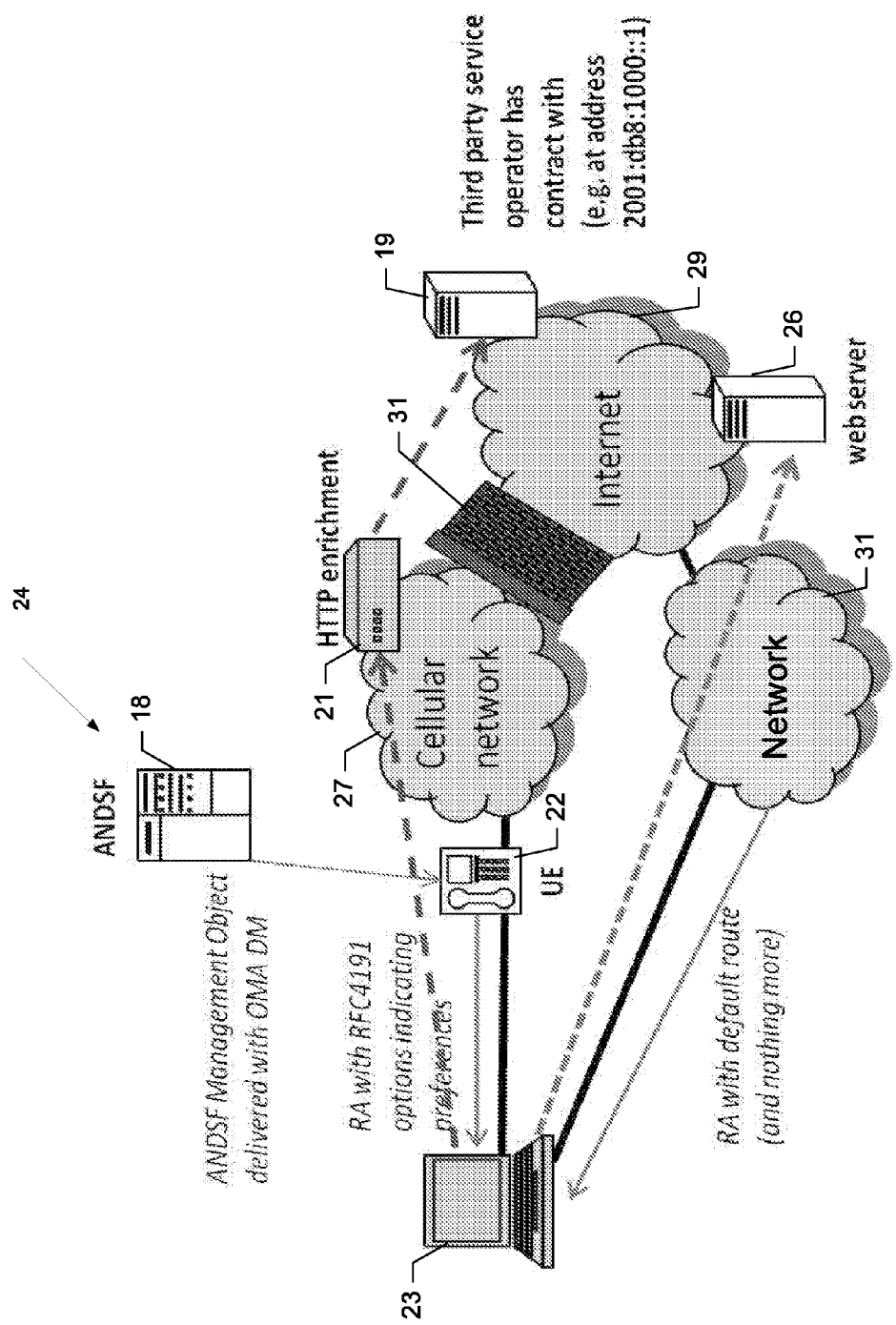
Figure 10:
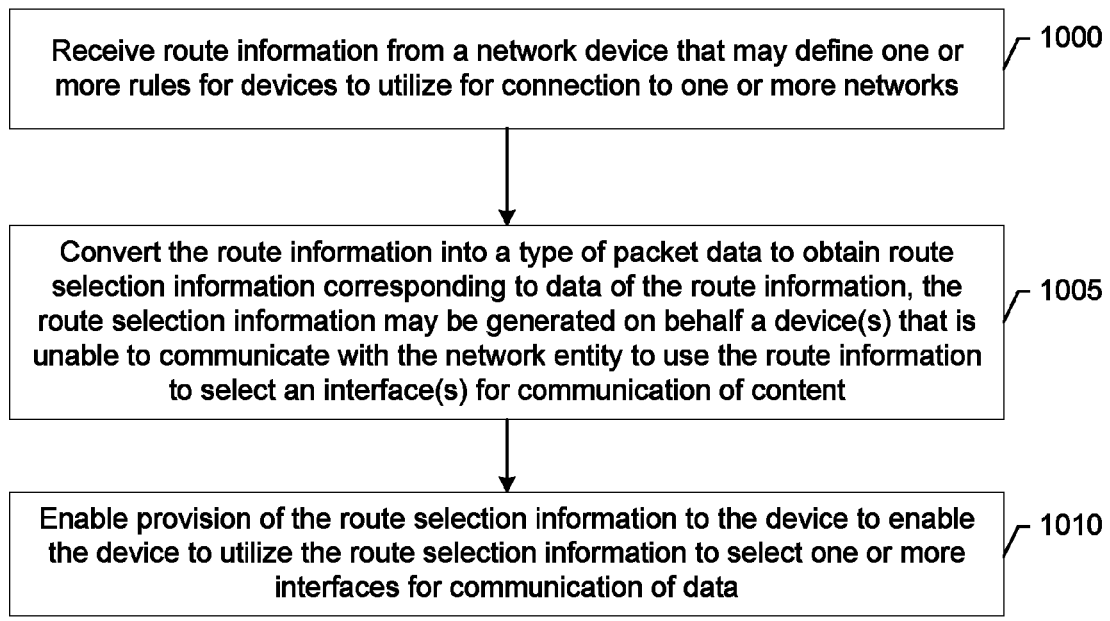
Figure 11:
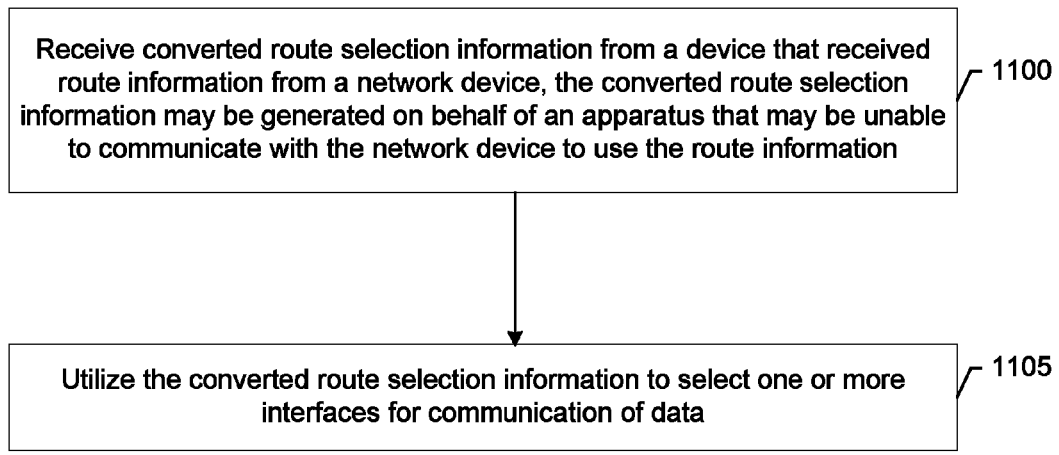

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of an network device according to an example embodiment of the invention;

FIG. 4 is a schematic block diagram of an entity according to an example embodiment of the invention;

FIG. 5 is a schematic block diagram of a system for enabling provision of route information and/or network information according to an example embodiment of the invention;

FIGS. 6A & 6B are diagrams illustrating an Inter-System Routing Policy Management Object for an ANDSF according to an example embodiment of the invention;

FIG. 7 is a diagram of default router information according to an example embodiment of the invention;

FIG. 8 is a diagram illustrating a Route Information Option according to an example embodiment of the invention;

FIG. 9 is a schematic block diagram of a system according to an example embodiment of the invention;

FIG. 10 is a flowchart for enabling provision of route information and/or network selection information to one or more devices according to an example embodiment of the invention; and FIG. 11 a flowchart for enabling selection one or more routes or interfaces for communication of data according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein a "3GPP compliant device(s)", a "3GPP device(s)", or a "3GPP UE(s)" may be a device(s) that complies with the 3GPP standard. As referred to herein a "3GPP system", a "3GPP compliant mobile system", a "3GPP compliant network", or a "3GPP compliant mobile network" may be a telecommunication system that complies with standards of 3GPP. Also, as referred to herein, a "non-3GPP compliant device(s)", a "non-3GPP compliant/aware device(s)", a "non ANDSF aware device(s)", or a "non-ANDSF capable device" may be a device(s) that is unable to communicate with an ANDSF and which may not comply with the 3GPP standard.

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ an embodiment of the present invention may comprise all the devices illustrated and/or described herein. While several embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, routers (e.g., home routers (e.g., a WLAN/DSL box)) audio/video players, radios, global positioning system (GPS) devices, Bluetooth headsets, Universal Serial Bus (USB) devices (e.g., USB dongles (e.g., USB data modem dongles)) or any combination of the aforementioned, and other types of voice and text communications systems, can readily employ embodiments of the present invention. Furthermore, devices that are not mobile, such as servers, routers, and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, 3rd Generation Partnership Project (3GPP) Network, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In some example embodiments, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In some example embodiments, the first communication device (e.g., the mobile terminal 10) may be a mobile communication device such as, for example, a wireless telephone or other devices such as a personal digital assistant (PDA), mobile computing device, camera, USB dongle (e.g., USB data modem dongle), video recorder, audio/video player, positioning device, game device, television device, radio device, or various other like devices or combinations thereof. In some example embodiments, the mobile terminal 10 may be a 3GPP compliant mobile terminal 10. Additionally, in some example embodiments, the mobile terminal 10 may receive routing and preferred network selection information from a network entity such as, for example, an ANDSF. In this regard, the mobile terminal 10 may convert or translate the data received from the ANDSF and may send the translated data to a non-3GPP compliant device(s) such that the non-3GPP compliant device(s) may obtain the routing and preferred network selection information of a network (e.g., a 3GPP compliant network), as described more fully below. In some example embodiments, the mobile terminal 10 (e.g., a USB dongle) may be connected to the first communication device 20 or the third communication device 25 to provide cellular data and/or packet data (e.g., Internet Protocol data). The second communication device 20 and the third communication device 25 may be mobile or fixed communication devices. However, in one example, the second communication device 20 and the third communication device 25 may be servers, remote computers or terminals such as personal computers (PCs) or laptop computers. In some example embodiments, the second communication device 20 and the third communication device 25 may be 3GPP complaint devices. However, in alternative example embodiments, the second communication device 20 and/or the third communication device 25 may be non-3GPP compliant devices. In these alternative example embodiments, the second communication device 20 and/or the third communication device 25 may be unable to communicate directly with a network entity such as, for example, an ANDSF to obtain routing and preferred network selection information. However, in some example embodiments, the mobile terminal 10 may obtain routing and preferred network selection information from the ANDSF and may provide the routing and preferred network selection information to the second communication device 20 and/or the third communication device 25.

In some example embodiments, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. According to some example embodiments, one or more of the devices in communication with the network 30 may employ a converter module (e.g., converter module 78 of FIG. 2). The converter module may receive routing and network selection information from an ANDSF. The converter module may translate the information received from the ANDSF to IETF data that may be utilized and understood by non 3GPP devices.

In some example embodiments, the mobile terminal as well as the second and third communication devices 20 and 25 may be configured to include the converter module. However, in alternative example embodiments, the mobile terminal 10 may include the converter module and the second and third communication devices 20 and 25 may be network entities such as, for example, servers or the like that are configured to communicate with the mobile terminal 10. In some other alternative example embodiments, the mobile terminal 10 may include the converter module, the second communication device 20 (e.g., a personal computer, laptop computer, server, workstation, etc.) may be connected to the mobile terminal and the third communication device 25 may be a network entity such as, for example, a server. In this regard, the mobile terminal 10 may provide data (e.g., cellular data, packet data, etc.) to the second communication device 20 connected to the mobile terminal 10. As such, the converter module may receive routing and network selection information from an ANDSF and may convert the data received from the ANDSF to data (e.g., IETF data) that may be understood by the second communication device 20 (e.g., a non 3GPP compliant device in this embodiment).

In some example embodiments, the mobile terminal as well as the second and third communication devices may employ an apparatus (e.g., apparatus of FIG. 2) capable of employing an embodiment of the invention.

FIG. 2 illustrates a schematic block diagram of an apparatus for providing routing and/or network selection information to one or more devices according to some example embodiments. Some example embodiments of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, embodiments may be employed on a combination of devices. Accordingly, some embodiments of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in certain embodiments.

Referring now to FIG. 2, the apparatus 50 may include or otherwise be in communication with a processor 70, a user interface 67, one or more communication interfaces 74 (also referred to herein as communication interface(s) 74), a memory device 76, a display 85 and a converter module 78. In one example embodiment, the display 85 may be a touch screen display. In some example embodiments, the apparatus 50 (also referred to herein as User Equipment (UE) 50 or UE 50) may be a 3GPP compliant device. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In some example embodiments, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.). The memory device 76 may also store data received from one or more network entities such as, for example, an Access Network Discovery and Selection Function (ANDSF) (e.g., a server). The data received from the ANDSF may include, but is not limited to, routing and/or network selection information. The network selection information may correspond to one or more network interfaces for selection that may be preferred by a network for communication of one or more types of data (e.g., cellular data, packet data, etc.).

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement embodiments of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In some example embodiments, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to embodiments of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In some example embodiments, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface(s) 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface(s) 74 may include, for example, an antenna (or multiple antennas) and supporting hardware and/or software for enabling communications with a wireless communication network (e.g., network 30). In fixed environments, the communication interface(s) 74 may alternatively or also support wired communication. As such, the communication interface(s) 74 may include a communication modem and/or other hardware/software for supporting communication via cable, digital subscriber line (DSL), universal serial bus (USB), Ethernet or other mechanisms. In this regard, for example, the interfaces of the communication interface(s) 74 may be utilized to communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. Additionally, the interfaces of the communication interface(s) 74 may enable communications by any of numerous different access mechanisms. For example, mobile/cellular access mechanisms such as Wideband Code Division Multiple Access (W-CDMA), CDMA2000, Global System for Mobile communications (GSM), General Packet Radio Service (GPRS) and/or the like.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In some example embodiments in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In some example embodiments, the processor 70 may be embodied as, include or otherwise control the converter module. The converter module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the converter module 78, as described below. Thus, in an example in which software is employed, a device or circuitry (e.g., the processor 70 in one example) executing the software forms the structure associated with such means.

The converter module 78 (also referred to herein as a Multi-InterFaced Host (MIF) converter 78) may receive communications from one or more network entities such as, for example, an ANDSF. The communications from the ANDSF may include data (e.g., rules, policies) specifying routing and network selection information to be utilized by devices in a corresponding network (e.g., a 3GPP compliant mobile network). The converter module 78 may convert the information received from the ANDSF to a format or standard that devices (e.g., non-3GPP compliant devices) unable to communicate with the ANDSF may understand. In an example embodiment, the converter module 78 may convert data received from the ANDSF to IETF data. The converter module 78 may convert the data received from the ANDSF using one or more IETF tools (e.g., Request for Comments (RFC) 4191, RFC 3442, RFC 4861, Dynamic Host Configuration Protocol for IPv6 (DHCPv6), etc.), as described more fully below. The IETF data may correspond to the routing and network selection information provided to the converter module 78 by the ANDSF. The converter module 78 may provide the IETF data to the one or more devices that may be unable to communication with the ANDSF. In this regard, one or more devices receiving the IETF data may route data and/or select one or more network interfaces for communication of data (e.g., packet data, cellular data, etc.) according to the data sent by the ANDSF to the apparatus 50, as described more fully below. In this manner, the converter module 78 may guide host devices with improved interface and route selection information.

Referring now to FIG. 3, a block diagram of one example of a network device is provided. The network device 90 (also referred to herein as ANDSF 90) may be a network entity such as, for example, a server for providing routing and/or network selection information to one or more devices (e.g., apparatus 50) in a network (e.g., a 3GPP compliant mobile network (e.g., network 30)). As shown in FIG. 3, the network device (e.g., a server (e.g., the third communication device 25)) generally includes a processor 94 and an associated memory 96. The memory 96 may comprise volatile and/or non-volatile memory, and may store content, data and/or the like. For example, the memory may store content, data, information, and/or the like transmitted from, and/or received by, the network device. Also for example, the memory 96 may store client applications, instructions, and/or the like for the processor 94 to perform the various operations of the network device in accordance with an embodiment of the invention, as described herein.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In some example embodiments, the processor 94 may be embodied as, include or otherwise control the ANDSF module 97. The ANDSF module 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the ANDSF module 97, as described below. Thus, in an example in which software is employed, a device or circuitry (e.g., the processor 94 in one example) executing the software forms the structure associated with such means.

The ANDSF module 97 may communicate routing and/or network selection information to one or more devices in a network (e.g., a 3GPP network). In some example embodiments, the ANDSF module 97 may be a network device of a network, such as, for example, a 3GPP network. In an alternative exemplary embodiment, the ANDSF module 97 may be a network device of any other suitable network that may be configured to deliver information about access technologies, provide routing information and/or network selection information to devices in the network. However, these devices may need to convert the information received from the ANDSF module 97 into a form that may be understood by other devices that are unable to communicate with the ANDSF module 97. The devices (e.g., UE 50) that may receive information from the ANDSF module 97 may be 3GPP compliant devices. In some example embodiments, the ANDSF module 97 may be unable to communicate with non-3GPP compliant devices. The information received by the devices (e.g., UEs) may include the access network discovery and selection information to assist the devices (e.g., UE 50) with selecting the access network or the Inter-System Mobility Policy to control and assist the devices (e.g., UE 50) with performing the inter-system change or both. The information may also include Inter-System Routing Policy (ISRP) information to control and assist a device (e.g., UE 50) capable of IP Flow Mobility (IFOM) or Multiple Access Public Data Network (PDN) Connectivity (MAPCON) or both with selecting the access network to be used for routing different Internet Protocol (IP) flows or establishing PDN connections or both. Additionally, the ISRP provided by the ANDSF module 97 may include information identifying IP flows for non-seamless offload to WLAN, Wi-Fi or the like for a device (UE) according to operator rules, policies and user preferences. The policies may indicate one or more preferences of one access network (e.g., cellular) over another (e.g., Wi-Fi) or may restrict inter-system mobility to a particular access network under certain conditions. The ANDSF module 97 may also specify validity conditions which may indicate when one or more policies are valid. These conditions may be based on time duration, location, etc. Additionally, the ANDSF module 97 may limit the information provided to a device (e.g., UE 50). This may be based on a device's (e.g., UE's) current location, the device's (e.g., UE) capabilities, or any other suitable criteria.

Referring now to FIG. 4, a block diagram of an example embodiment of an entity is provided. In some example embodiments, the entity may be a network device (e.g., a server). In alternative example embodiments, the entity may not be a network device. Instead, in these alternative example embodiments, the entity (e.g., a personal computer, laptop computer, workstation, server, etc.) may be connected to UE 50. In this regard, the UE 50 may, but need not, be attached to the entity. As shown in FIG. 4, the entity generally includes a processor 104 and an associated memory 106. The memory 106 may comprise volatile and/or non-volatile memory, and may store content, data and/or the like. The memory 106 may store client applications, instructions, and/or the like for the processor 104 to perform the various operations of the entity 100.

The processor 104 may also be connected to one or more communication interfaces 107 (also referred to herein as communication interface(s) 107) or other means for displaying, transmitting and/or receiving data, content, and/or the like. One or more of the interfaces of the communication interface(s) 107 may enable communications in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. Additionally, one or more of the interfaces of the communication interface(s) 107 may enable communications according to any of numerous different access mechanisms, such as, for example, mobile/cellular access mechanisms such as Wideband Code Division Multiple Access (W-CDMA), CDMA2000, Global System for Mobile communications (GSM), General Packet Radio Service (GPRS) and/or the like may be supported. In one example embodiment, in an instance in which a UE 50 may be connected to an interface(s) of the communication interface(s) 107, the UE 50 may provide the access to mobile access mechanisms (e.g., cellular access (e.g., W-CDMA, GSM, CDMA2000, etc.) and/or wireless access mechanisms (e.g., WLAN, WiMAX, Wi-Fi, etc.) to the entity.

The user input interface 105 may comprise any of a number of devices allowing the entity 100 to receive data from a user, such as a keypad, a touch display, a joystick or other input device. In this regard, the processor 104 may comprise user interface circuitry configured to control at least some functions of one or more elements of the user input interface. The processor 104 and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In some embodiments, the entity 100 may receive routing and/or network selection information from a UE (e.g., UE 50). The routing and/or network information received from the UE may be translated based on information that the UE received from an ANDSF (e.g., ANDSF 90). In this regard, the entity may route data and/or select network interfaces of the communication interface(s) 107 in the manner specified by the data received from the UE.

In alternative example embodiments, in an instance in which the entity 100 may be a network entity, the entity 100 may transmit and/or receive data, information, content or the like from one or more devices in a network.

In some example embodiments, UE 50 (e.g., a 3GPP UE (e.g., a handset) may understand data received from an ANDSF, (e.g., ANDSF 90), which may be configured via 3GPP ANDSF technology. In this regard, the UE 50 may guide one or more connected or attached non-3GPP compliant/aware devices (such as, for example, a PC) to improve their route selection by generating IP-layer control messages, defined by IETF standards, based on information received via the ANDSF. In order to enable the non-3GPP compliant devices to understand and utilize the data from the ANDSF, the converter module 78 of the UE 50 may convert or translate the data received from the ANDSF to IETF data by utilizing one or more IETF tools. The IETF tools may be utilized by the converter module 78 to specify the manner in which data (e.g., IP data (e.g., packets), cellular data, etc.) data may be routed to hosts or nodes, etc.

In this regard, these IETF tools may be utilized, by the converter module 78, to convert or translate the data, sent from the ANDSF, to IETF data so that the IETF data may be utilized by non-3GPP devices. In an example embodiment, the IETF tools may include, but are not limited to, RFC 4191, RFC 3442, RFC 4861, DHCPv6, or any other suitable IETF tools. The converter module 78 may send the translated data to one or more non-3GPP devices in one or more routing advertisements (RA) (also referred to herein as Router Advertisement(s)).

In some example embodiments, the converter module 78 may modify a Router Advertisement sent by the network 30, for example, the converter module 78 may modify a routing advertisement sent by the network 30 to set a Preferred Lifetime Field of a Prefix Information Option (PIO) of advertised prefixes in the routing advertisement (RA) sent by a cellular network (e.g., network 30) to a value of zero. By setting a Preferred Lifetime field of a PIO to zero, the converter module 78 may enable a non-3GPP device(s) to utilize other interfaces as well as some routing protocols, or improved methods for address selection configuration, etc. Additionally, the converter module 78 may ensure that a value of a Valid Lifetime Field of the PIO of the RA is greater than zero, but not 0xffffffff since a value of 0xdfffffff defines an infinite lifetime. These modifications to the Preferred Lifetime Field of the PIO and the Valid Lifetime Field of the PIO of a RA may be sent by the converter module 78 to a device to instruct the device (e.g., a non-3GPP device (e.g., a personal computer, laptop computer, etc.) regarding the manner in which to route information and which network interface(s) to select for communicating information. It should be pointed out that the Preferred Lifetime Field and the Valid Lifetime Field of the PIO of a RA may be defined by an IETF tool such as, for example, RFC 4861.

In some example embodiments, the UE 50 may, for example, implement a DHCP server and may communicate locally route information towards the host operating system IP stack. In this regard, a host device (e.g., a non-3GPP device in this example) may receive the route information and may make intelligent routing decisions based on the route information. For example, the UE 50 may utilize DHCP Classless Route Option or a DHCPv6 Route Option to communicate route information to the host device. In some alternative example embodiments, in addition to being able to modify a Router Advertisement received from the network 30, the UE 50 may also originate or create routing advertisements (RAs) to configure a host operating system IP stack. In this regard, a host device may receive the originated RA and may make routing decisions on the basis of the information (e.g., routing, network selection information) in the RA. In another alternative example embodiment, the UE 50 may direct a host device(s) to use Stateful DHCPv6 for its address allocation procedures, in which case the UE 50 may gain better control of the host device than instances in which the UE 50 may send RAs to the host device(s) (e.g., a non-3GPP compliant/aware device) to communicate rules/policies, routing information and/or network selection information defined by the network.

For purposes of illustration and not of limitation consider an instance in which a network may communicate to an ANDSF (e.g., ANDSF 90) that devices in the network should use a cellular interface when the devices are operating in a LTE network, but to use a Wi-Fi interface when the devices are within a 2G network. In this regard, upon receipt of this routing and network selection information from the ANDSF, the converter module 78 of a UE (e.g., UE 50) may convert the information utilizing one or more IETF tools in a manner that may be understood by the devices. In this regard, in an instance in which a corresponding device (e.g., a non-3GPP compliant/aware device) may move and enter locations where a cellular uplink may be more or less prevalent, the UE 50 may update the corresponding device (e.g., a non-3GPP device (e.g., a personal computer)) accordingly by reconfiguring routing information on the device such that when the device is in an LTE network, the UE 50 may instruct the device to prefer the cellular interface, but when the device is in a 2G network, the UE 50 may instruct the device to prefer some other type of network interface (e.g., a WLAN interface).

Referring now to FIG. 5, a diagram of an example system for providing routing and/or network selection information to one or more devices according to an example embodiment is provided. In the example of FIG. 5, the system 2 may include an ANDSF 3 (e.g., ANDSF 90), a UE 7 (e.g., UE 50), a device 5 (e.g., entity 100 (e.g., personal computer, laptop computer)), an operator content server 8 (e.g., second communication device 20), a web server 9 (e.g., third communication device 25) and a firewall 11. For purposes of illustration and not of limitation, the example embodiment of FIG. 5 may illustrate an example of a device accessing Operator Content Services via a cellular interface and Internet web services via a network. In the example of FIG. 5, the device 5 may be unable to communicate directly with ANDSF 3 and in this regard, the device 5 may initially be unable to receive routing and network (e.g., network interface) selection information that a network operator may desire to provision via the ANDSF 3. In this regard, the device 5 may be a non-3GPP compliant/aware device.

In the example of FIG. 5, the device 5 (e.g., personal computer) may be connected to the Internet via network 14 (e.g., via a Digital Subscriber Line (DSL) network, a WLAN, a LAN, a Bluetooth network, etc. In addition, the device 5 may be connected to the cellular network 12 by the UE 7. In the example of FIG. 5, the operator services on the cellular network 12 may be reachable or accessible via cellular access, and may not be reachable or accessible through the Internet 16. In this regard, the firewall 11 may be between the operator content server 8 and the Internet 16.

In the example embodiment of FIG. 5, the ANDSF 3 may perform an Inter-System Routing Policy Management Object according to, for example, the Inter-System Routing Policy Management Object shown in FIGS. 6A and 6B. Additionally, in the example of FIG. 5, the UE 7 may be configured with an ADNSF Management Object (MO) by ANDSF services (using Open Mobile Alliance (OMA) Device Management (DM) as a manner in which to deliver information). Among other things, the ANDSF 3 is configured to deliver the following information to the UE 7. It should be pointed out that in the example of FIG. 5, the SourceIPaddress may be generated from a network point of view (e.g., a host point of view). As such, the "SourceIPaddress" may actually be the destination's IP address:

---

Name: Operator Content Services

/ISRP/A__ISRP__1/ForFlowBased/A__flow__1/IPFlow/Traffic__1/StartSourceIPaddress:2001:db8::0
/ISRP/A__ISRP__1/ForFlowBased/A__flow__1/IPFlow/Traffic__1/EndSourceIPadress:2001:db8::ffff
/ISRP/A__ISRP__1/ForFlowBased/A__flow__1/RulePriority:1
/ISRP/A__ISRP__1/ForFlowBased/A__flow__1/RoutingRule/Route__1/AccessTechnology:3GPP
/ISRP/A__ISRP__1/ForFlowBased/A__flow__1/RoutingRule/Route__1/AccessNetworkPriority:1
Name: Default Internet /ISRP/A__ISRP__1/ForFlowBased/A__flow__2/RulePriority:250
/ISRP/A__ISRP__1/ForFlowBased/A__flow__2/RoutingRule/Route__1/AccessTechnology:WLAN
/ISRP/A__ISRP__1/ForFlowBased/A__flow__2/RoutingRule/Route__1/AccessNetworkPriority:1

---

Based on the route information above, provided by the ANDSF 3, the converter module 78 of the UE 7 may utilize, an IETF tool(s) such as RFC 4191, in this example embodiment, to convert the route information provided by the ANDSF 3 in order to inform the device 5 that the cellular interface (e.g., an interface of communication interface(s) 107) is low priority by default since the ADNSF 3 instructed the default to be WLAN and not cellular. On the other hand, the converter module 78 of the UE 70 may determine that the route information specifies that data going to addresses within the range 2001:db8::0-2001:db8::ffff should always be sent over cellular, via cellular network 12. As shown above, addresses associated with the "Operator Content Services" are within the range 2001:db8::0-2001:db8::ffff. As such, the converter module 78 may determine that data to be provided to these addresses is to be sent via a cellular interface (e.g., cellular network 12).

In this regard, the converter module 78 of the UE 7 may generate a new routing advertisement to send the device 5 indicating that the cellular interface is low priority but that data to be provided for addresses within the range 2001:db8::0-2001:db8::ffff should always be sent over cellular, via cellular network 12. Alternatively, the converter module 78 may include this information in a modified RA. The modified RA may be based on a modification of an original RA sent by a Gateway General Packet Radio Service (GPRS) Support Node (GGSN) of a network or system. In this regard, the converter module 78 of the UE 70 may include data in a RA specifying that a route preference (prf) field indicates default router preferences are "low" such as, for example, "11" in binary, as shown in FIG. 7 to indicate a low default route preference for cellular. Additionally, the converter module 78 of the UE 50 may generate the RA to have a Route Information Option configuring the same prefix received via the ANDSF 3, as shown in FIG. 8.). For example, in FIG. 8, the "Prefix Length" is 112 in decimal (e.g., matching the address range received via ANDSF 3. The route preference (prf) is set may be included in HTTP requests may include, but is not limited to, device information of a UE, geographical location, roaming information, a token identifying a user(s) without revealing the actual identity of the user(s), and any other suitable information. The information may be added into HTTP headers by a GGSN. The third party operator server 19 in this example is at 2001:db8:1000::1. In this regard, a processor (e.g., processor 104) of the third party operator server 19 may communicate with ANDSF 18 (e.g., ANDSF 90) to specify that data going to address 2001:db8:1000::1 may be sent over cellular access. Assuming the operator is also running its own content services the route information rules delivered to the UE 22, by the ANDSF 18 may include two sets of ISRP rules, as shown below:

Name: Operator Content Services

/ISRP/A__ISRP__1/ForFlowBased/A__flow__1/IPFlow/Traffic__1/StartSourceIpaddress:2001:db8::0
/ISRP/A__ISRP__1/ForFlowBased/A__flow__1/IPFlow/Traffic__1/EndSourceIpadress:2001:db8::ffff
/ISRP/A__ISRP__1/ForFlowBased/A__flow__1/IPFlow/Traffic__2/StartSourceIpaddress:2001:db8:1000::1
/ISRP/A__ISRP__1/ForFlowBased/A__flow__1/IPFlow/Traffic__2/EndSourceIpadress:2001:db8:1000::1
/ISRP/A__ISRP__1/ForFlowBased/A__flow__1/RulePriority:1
/ISRP/A__ISRP__1/ForFlowBased/A__flow__1/RoutingRule/Route__1/AccessTechnology:3GPP
/ISRP/A__ISRP__1/ForFlowBased/A__flow__1/RoutingRule/Route__1/AccessNetworkPriority:1

Name: Default Internet

/ISRP/A__ISRP__1/ForFlowBased/A__flow__2/RulePriority:250
/ISRP/A__ISRP__1/ForFlowBased/A__flow__2/RoutingRule/Route__1/AccessTechnology:WLAN
/ISRP/A__ISRP__1/ForFlowBased/A__flow__2/RoutingRule/Route__1/AccessNetworkPriority:1 to high (e.g., "01" binary), by the converter module 78 and the "prefix" is set to 2001:db8:0000:0000:0000:0000:0000 (e.g., hexadecimal). The prf set to high in the Route Information Option by the converter module 78 may denote that the route preference for the data going to addresses within the range 2001:db8::0-2001:db8::ffff, via cellular (e.g., cellular network 12) is high since this is specified in the "Operator Content Services".

In an instance in which the device 5 receives the generated Router Advertisement 17 (or a DHCPv6 message in one embodiment) from converter module 78 of the UE 7, and receives also Router Advertisement 15 from an interface such as, for example, via a DSL interface of network 14 with preference "default", the processor (e.g., processor 104) of the device 5 may determine that data is sent out by default via an interface such as, for example, a DSL interface (e.g., since the DSL interface indicated "default" priority default route. On the other hand, the processor of the device 5 may determine that cellular indicated a "low" priority default route, but data going towards addresses 2001:db8::/112 is to be sent out via cellular (e.g., cellular network 14) as the device 5 may have received this Route Information Option via its cellular interface (e.g., an interface of the communication interface(s) 107).

Referring now to FIG. 9, a diagram of an example system for providing route information and/or network selection information to one or more devices according to an example embodiment is provided. In the example embodiment of the system 24 of FIG. 9, an operator may perform HTTP enrichment for selected third party content providers and may wish to route traffic destined to such providers via cellular access.

In the example embodiment of FIG. 9, there may be one or more third parties providing services for which an operator may want to add "more information" into HTTP requests sent by UEs, so that third parties may make use of this additional information (e.g., the operator may perform HTTP enrichment via HTTP enrichment device 21). The information that In the example embodiment of FIG. 9, the converter module 78 of UE 22 may analyze the route information (e.g., the data associated with "Operator Content Services" and "Default Internet") received from the ANDSF 18 and may utilize IETF tools such as, for example, RFC 4191, to convert the route information to an IETF data format that the device 23 (e.g., a non-3GPP compliant/aware device (e.g., a personal computer)) may understand. Although the converter module 78 may utilize RFC 4191 in this example as an IETF tool for converting data to IETF data, it should be pointed out that the converter module 78 may utilize any other suitable IETF tools (e.g., RFC 3442, RFC 4861, a DHCPv6 message(s), etc.) without departing from the spirit and scope of the invention By analyzing the data of the route information sent from the ANDSF 18, the converter module 78 may determine that data associated with the address range 2001:db8::0-2001:db8::ffff is to be provided via a cellular interface or cellular network 27, similar to the example of FIG. 5. Also, the converter module 78 may determine data for the single address at 2001:db8:1000::1. For the third party operator server 18 is to be provided via a cellular interface or cellular network 27, as specified by the third party operator. Also, the converter module 78 may determine that the default interface for provision of data is WLAN based on the data associated with "Default Internet". In this regard, in one embodiment, the converter module 78 may generate Route Information Options for an RA in two different ways.

As one approach, the converter module 78 may generate two separate Route Information Options, both with high preference marking, for example, 1) for prefix 2001:db8::/112 corresponding to addresses in the range 2001:db8::0-2001:db8::ffff (e.g., similar to the example embodiment of FIGS. 5) and 2) with a prefix 2001:db8:1000::1/128, (e.g., for an individual address (e.g., the address at which the third party operator server 17 is to receive content (e.g., cellular content)). By generating two separate Route Information Options the converter module 78 may ensure the desired data is sent over the cellular interface via the cellular network 27.

The alternative approach or option may be for the converter module 78 to aggregate both prefixes (e.g., 2001:db8::/112 and 2001:db8:1000::1/128 (e.g., where prefix/128 may denote a single IPv6 address)) into one Route Information Option, in this example corresponding to prefix: 2001:db8::/35. The aggregation may be performed by the converter module 78 by selecting a longest possible prefix that covers all the prefixes being aggregated together. In this example, the converter module 78 may determine that the aggregated prefix is 2001:db8::/35, since the $36^{th}$ bit, counting from left, is where the two addresses (e.g., 2001:db8::/112 and 2001:db8:1000::1/128) start to differ from each other. However, a downside of this alternative approach may be that it may cause the device 23 to send any data matching with the generic prefix over cellular, which may be undesirable particularly if other data is specified to be routed according to another mechanism (e.g., WLAN). As such, in simple cases aggregating prefixes in a single Route Information Option may, but need not, be undesirable. On the other hand, aggregating prefixes in a single Route Information Option may sometimes help to decrease the number of Route Information Options needed in an RA. This may be used in an instance in which it may be important to ensure all packets are destined to an operator configured with prefixes for data sent over cellular, and in which potential "other" data that may be sent over cellular by "accident" may not cause much harm.

It should be pointed out that in the example embodiment of FIG. 9, the converter module 78 may examine the data sent by the ANDSF 18 and may determine that the default is WLAN associated with the "Default Internet" information. As such, the converter module 78 may specify in a RA that the default for data is WLAN.

Referring now to FIG. 10, a flowchart for enabling provision of route information and/or network selection information to one or more devices is provided. At operation 1000, an apparatus (e.g., UE 50) may receive route information from a network device (e.g., ANDSF) that may define one or more rules for devices (e.g., UEs, non-3GPP compliant devices, etc.) to utilize for connection to one or more networks (e.g., cellular network, WLAN, etc). At operation 1005, an apparatus (e.g., converter module 78) may convert the route information into a type of packet data (e.g., IETF data) to obtain route selection information corresponding to data of the route information. The route selection information may be generated on behalf of at least one device (e.g., device 5 (e.g., a personal computer)) that is unable to communicate with the network entity (e.g., ANDSF 90) to use the route information to select at least one interface for communication of content. At operation 1010, an apparatus (e.g., converter module 78) may enable provision of the route selection information to a device (e.g., device 5 (e.g., a personal computer)) to enable the device to utilize the route selection information to select one or more interfaces (e.g., a cellular interface) for communication of data (e.g., cellular data).

Referring now to FIG. 11, a flowchart for enabling selection one or more routes or interfaces for communication of data is provided. At operation 1100, an apparatus (e.g., device 5 (e.g., a personal computer)) may receive converted route selection information from a device (e.g., UE 50) that received route information from a network device (e.g., ANDSF 90). The converted route selection information may be generated on behalf of the apparatus (e.g., device 5), which may be unable to communicate with the network device (e.g., ANDSF 90) to use the route information. The network device (e.g., ANDSF 90) may define one or more rules for devices to utilize for connection to one or more networks (e.g., cellular networks, WLANs, etc.).

At operation 1105, an apparatus (e.g., a processor (e.g., processor 104) of a device (e.g., device 5)) may utilize the converted route selection information to select one or more interfaces for communication of data.

It should be pointed out that FIGS. 10 & 11 are flowcharts of a system, method and computer program product according to an example embodiment of the invention. It will be understood that each block of the flowcharts, and combinations of blocks in the flowcharts, may be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96, memory 106) and executed by a processor (e.g., processor 70, converter module 78, ANDSF module 97, processor 104). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 10 & 11 above may comprise a processor (e.g., the processor 70, the converter module 78, the ANDSF module 97, the processor 104) configured to perform some or each of the operations (1000-1010, 1100-1105) described above. The processor may, for example, be configured to perform the operations (1000-1010, 1100-1105) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (1000-1010, 1100-1105) may comprise, for example, the processor 70 (e.g., the converter module 78, the ANDSF module 97, the processor 104) as means for performing any of the operations described above), and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving route information from a network device that defines one or more rules for devices to utilize for connection to one or more networks; converting the route information into a type of packet data to obtain route selection information corresponding to data of the route information, the route selection information is generated on behalf of at least one device that is unable to communicate with the network device to use the route information to select at least one interface for communication of content; and enabling provision of the route selection information to the at least one device to enable the at least one device to utilize the route selection information to select one or more interfaces for communication of data.

2. The method of claim 1, wherein: the at least one device does not comply with a 3rd generation partnership project standard; and the network device comprises an access network discovery and selection function.

3. The method of claim 1, wherein the type of packet data comprises internet engineering task force data which the at least one device is configured to understand and recognize for selection of the one or more interfaces for communication of the data.

4. The method of claim 1, wherein: the route information corresponds to access network discovery and selection function data; and converting the route information comprises translating the access network discovery and selection function data into internet engineering task force content.

5. The method of claim 1, wherein converting the route information comprises selection of at least one internet engineering task force tool, among a plurality of internet engineering task force tools, to facilitate translation of the routing information to the route selection information.

6. The method of claim 1, wherein: enabling provision comprises enabling sending of at least one generated router advertisement to the at least one device instructing the at least one device regarding at least one interface to select for communication of at least one particular type of data.

7. The method of claim 6, wherein the generated router advertisement comprises at least one prefix corresponding to one or more addresses for communication of data wherein the prefix corresponds to a prefix of the routing information generated by the access network discovery and selection function.

8. The method of claim 1, wherein prior to enabling provision, the method further comprises modifying at least one received router advertisement generated by a network entity, and wherein, enabling provision comprises enabling sending of the modified router advertisement to the at least one device, the modified router advertisement comprises data instructing the at least device to select at least one interface for communication of a particular type of data.

9. An apparatus comprising:
at least one processor; and at least one memory including computer program code, the at least one memory and the computer program code configured to, with the at least one processor, cause the apparatus to: receive route information from a network device that defines one or more rules for devices to utilize for connection to one or more networks; convert the route information into a type of packet data to obtain route selection information corresponding to data of the route information, the route selection information is generated on behalf of at least one device that is unable to communicate with the network device to use the route information to select at least one interface for communication of content; and enable provision of the route selection information to the at least one device to enable the at least one device to utilize the route selection information to select one or more interfaces for communication of data.

10. The apparatus of claim 9, wherein: the at least one device does not comply with a 3rd generation partnership project standard; and the network device comprises an access network discovery and selection function.

11. The apparatus of claim 9, wherein the type of packet data comprises internet engineering task force data which the at least one device is configured to understand and recognize for selection of the one or more interfaces for communication of the data.

12. The apparatus of claim 9, wherein the route information corresponds to access network discovery and selection function data and wherein the at least one memory and the computer program code are further configured to, with the processor, cause the apparatus to: convert the route information by translating the access network discovery and selection function data into internet engineering task force content.

13. The apparatus of claim 9, wherein the at least one memory and the computer program code are further configured to, with the processor, cause the apparatus to: convert the route information by selection of at least one internet engineering task force tool, among a plurality of internet engineering task force tools, to facilitate translation of the routing information to the route selection information.

14. The apparatus of claim 9, wherein, the at least one memory and the computer program code are further configured to, with the processor, cause the apparatus to: enable provision by enabling sending of at least one generated router advertisement to the at least one device instructing the at least one device regarding at least one interface to select for communication of at least one particular type of data.

15. The apparatus of claim 14, wherein: the generated router advertisement comprises at least one prefix corresponding to one or more addresses for communication of data wherein the prefix corresponds to a prefix of the routing information generated by the access network discovery and selection function; and the apparatus is compliant with the 3rd generation partnership project.

16. The apparatus of claim 9, wherein prior to enable provision, the at least one memory and the computer program code are further configured to, with the processor, cause the apparatus to: modify at least one received router advertisement generated by a network entity, and enable provision by enabling sending of the modified router advertisement to the at least one device, the modified router advertisement comprises data instructing the at least one device to select at least one interface for communication of a particular type of data.

17. A computer program product comprising at least one computer-readable storage medium having computer-executable program code instructions stored therein, the computer-executable program code instructions comprising:

program code instructions configured to cause receipt of route information from a network device that defines one or more rules for devices to utilize for connection to one or more networks; and program code instructions configured to convert the route information into a type of packet data to obtain route selection information corresponding to data of the route information, the route selection information is generated on behalf of at least one device that is unable to communicate with the network device to use the route information to select at least one interface for communication of content; and program code instructions configured to enable provision of the route selection information to the at least one device to enable the at least one device to utilize the route selection information to select one or more interfaces for communication of data.

18. The computer program product of claim 17, wherein: the at least one device does not comply with a 3rd generation partnership project standard; and the network device comprises an access network discovery and selection function.

19. The computer program product of claim 17, wherein the type of packet data comprises internet engineering task force data which the at least one device is configured to understand and recognize for selection of the one or more interfaces for communication of the data.

20. The computer program product of claim 17, wherein the route information corresponds to access network discovery and selection function data and wherein the computer program product further comprises: program code instructions configured to convert the route information by translating the access network discovery and selection function data into internet engineering task force content.

* * * * *